United States Patent [19]
Wilt et al.

[11] Patent Number: 6,046,296
[45] Date of Patent: Apr. 4, 2000

[54] CURABLE COMPOSITIONS BASED ON FUNCTIONAL POLYSILOXANES

[75] Inventors: Truman F. Wilt, Clinton; David N. Walters, Slippery Rock; James A. Claar, Apollo; Karen D. Donnelly, Allison Park; Joseph M. Carney, Gibsonia, all of Pa.; Andrew R. Wolff, Lake Villa, Ill.

[73] Assignee: PPG Industries Ohio, Inc., Cleveland, Ohio

[21] Appl. No.: 09/309,800

[22] Filed: May 11, 1999

Related U.S. Application Data

[62] Division of application No. 08/904,597, Aug. 1, 1997, Pat. No. 5,939,491.

[51] Int. Cl.$^7$ .................................................. C08G 77/388
[52] U.S. Cl. ........................... 528/41; 525/100; 525/474; 528/27; 528/28; 528/33; 556/419
[58] Field of Search ..................... 525/474, 100; 528/27, 28, 33, 41; 556/419

[56] References Cited

U.S. PATENT DOCUMENTS

| | | | |
|---|---|---|---|
| 3,317,460 | 5/1967 | Clark et al. | 260/46.5 |
| 3,398,174 | 8/1968 | Barnes | 260/448.2 |
| 4,025,456 | 5/1977 | Litteral et al. | 252/351 |
| 4,431,789 | 2/1984 | Okazaki et al. | 528/15 |
| 4,689,383 | 8/1987 | Riffle et al. | 528/12 |
| 4,808,649 | 2/1989 | Gay et al. | 524/264 |
| 4,925,659 | 5/1990 | Grollier et al. | 424/78 |
| 5,066,720 | 11/1991 | Ohsugi et al. | 525/100 |
| 5,248,789 | 9/1993 | Wolff | 549/215 |
| 5,260,469 | 11/1993 | Swiatek | 556/445 |
| 5,395,955 | 3/1995 | Okawa et al. | 556/449 |
| 5,432,233 | 7/1995 | Miyazoe et al. | 525/103 |
| 5,475,124 | 12/1995 | Mazurek et al. | 556/419 |
| 5,614,640 | 3/1997 | Okawa | 549/215 |

FOREIGN PATENT DOCUMENTS

| | | |
|---|---|---|
| 0277816 | 8/1988 | European Pat. Off. . |
| 1 193 504 | 2/1965 | Germany . |
| 1 545 040 | 7/1970 | Germany . |
| 09227688 | 9/1997 | Japan . |
| 10017670 | 1/1998 | Japan . |
| 1293331 | 10/1972 | United Kingdom . |

OTHER PUBLICATIONS

"Synthesis of Novel Organic Oligomers Containing Si–H Bonds", T. Iwahara, M. Kusakabe, M. Chiba and K. Yonezawa, Journal of Polymer Science: Part A: Polymer Chemistry, vol. 31, pp. 2617–2631 (1993), John Wiley & Sons, Inc.

"Siloxanes with aliphatic isocyanate groups, A tetrafunctional cross–linking agent", Guangbin Zhou and Richard Fragnito, Johnannes Smid, Polymer Bulletin 22, pp. 85–88 (1989), Springer–Verlag.

"Regioselective Rhodium—Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

*Primary Examiner*—David W. Wu
*Assistant Examiner*—Caixia Lu-Rutt
*Attorney, Agent, or Firm*—William J. Uhl

[57] ABSTRACT

Curable compositions containing novel polysiloxanes having various reactive functional groups are disclosed. The curable compositions are useful as both ambient-cured and thermally-cured coating compositions which provide such properties as excellent appearance, mar resistance, acid etch resistance, adhesion, pot life, improved tack time, mar resistance and corrosion resistance.

6 Claims, No Drawings

CURABLE COMPOSITIONS BASED ON FUNCTIONAL POLYSILOXANES

This is a division of application Ser. No. 08/904,597, filed Aug. 1, 1997, now U.S. Pat. No. 5,939,491.

BACKGROUND OF THE INVENTION

Polysiloxane polyols are well known in the art. Japanese Patent Publication 48-19941 describes polysiloxane polyols which are obtained by the dehydrogenation reaction between a polysiloxane hydride and an aliphatic polyhydric alcohol or polyoxyalkylene alcohol to introduce the alcoholic hydroxy groups onto the polysiloxane backbone. In practice, however, it is difficult to obtain an industrially significant yield of such polysiloxane polyols because such a hydrosilylation reaction readily gels. Another problem encountered with this hydrosilylation reaction is the difficulty in obtaining a solvent capable of dissolving both reactants. Strongly hydrophilic alcohols such as polyglycerols are highly soluble in alcohols and water, but insoluble in hydrocarbon solvents. Polysiloxanes, however, are generally only soluble in hydrocarbon solvents such as toluene or n-hexane.

U.S. Pat. No. 4,431,789 to Okazaki et al. discloses a polysiloxane polyol which is obtained by the hydrosilylation reaction between a polysiloxane containing silicon hydride and a polyglycerol compound having an aliphatically unsaturated linkage in the molecule. Examples of such polyglycerol compounds are those obtained by the reaction of allyl alcohol and glycidol or by the reaction of diglycerin and allyl glycidyl ether. This reaction, a so-called hydrosilylation reaction, is the addition reaction between an organosilicon compound having a hydrogen atom directly bonded to the silicon atom, i.e., a polysiloxane hydride, and an organic compound having aliphatic unsaturation in the molecule carried out in the presence of a catalytic amount of a Group VIII noble metal. The hydrosilylation reaction can proceed readily in the presence of an alcoholic solvent which can dissolve both reactants. The resulting polysiloxane polyols are useful as non-ionic surface active agents. However, the polysiloxane polyols have limited compatibility with organic resins and solvents which restricts their use in solvent-borne coatings.

U.S. Pat. No. 5,260,469 discloses butoxylated polysiloxane polyols which are disclosed as being useful in cosmetics. U.S. Pat. No. 5,248,789 discloses epoxy functional polysiloxanes which are formed by reacting a polysiloxane-containing silicon hydride with allyl glycidyl ether.

The prior art references do not teach further reacting the hydroxyl groups of the polysiloxane polyols with other groups to provide various reactive functional groups pendant from the polysiloxane backbone. Such reactive functional groups allow incorporation of the polysiloxane moiety into curable compositions which can contain a variety of reactive components, including a variety of curing agents. There is no indication in the references of using either the polysiloxane polyols or their derivatives as major components in curable compositions.

SUMMARY OF THE INVENTION

The present invention relates to curable compositions comprising an organic polysiloxane which can contain a variety of reactive functional groups and a curing agent which contains functional groups reactive with the functional groups of the polysiloxanes. Such curable compositions are particularly useful in coating compositions which are curable at both ambient and thermal cure conditions where they provide such excellent properties as increased pot-life, improved tack-time, adhesion, mar resistance and acid etch resistance.

The curable composition of the present invention comprises an organic polysiloxane containing reactive functional groups, said polysiloxane having the following general structure:

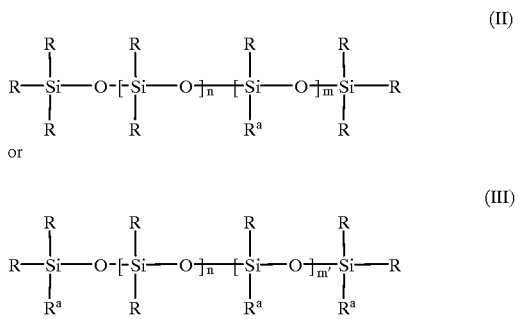

where m is at least 1; m' is 0 to 50; n is 0 to 50; R is selected from the group consisting of OH and monovalent hydrocarbon groups connected to the silicon atoms; $R^a$ as the following structure:

$$R_1\text{—O—X} \qquad (IV)$$

wherein $R_1$ is alkylene, oxyalkylene or alkylene aryl; and X is a moiety containing a functional group selected from the group consisting of OH, COOH, NCO, carboxylate such as ester, carbonate and anhydride, primary amine, secondary amine, amide, carbamate and epoxy functional groups; and a component which contains functional groups reactive with the functional groups of the organic polysiloxane.

Preferably, the curable composition comprises:

(a) an organic polysiloxane containing reactive functional groups, the polysiloxane having the formula (II) or (III), where m, m', n, R, $R^a$ and X are as described above;

(b) a polymer or oligomer which contains reactive functional groups; and (c) a curing agent containing functional groups which are reactive with the functional groups of (a) and (b). In one preferred embodiment n+m and n+m' is 2 or 3.

DETAILED DESCRIPTION OF THE INVENTION

Generally, the curable composition of the present invention comprises:

(a) an organic polysiloxane containing reactive functional groups, the polysiloxane having the formula (II) or (III), where m, m', n, R., $R^a$ and X are as described above; and (b) a curing agent which contains functional groups reactive with the functional groups of (a).

It should be appreciated that the various R groups can be the same or different, and it is usually the case that the R groups will be mixed groups or entirely monovalent hydrocarbon groups.

By monovalent hydrocarbon groups is meant organic groups containing essentially carbon and hydrogen. The hydrocarbon groups may be aliphatic, aromatic, cyclic or acyclic and may contain from 1 to 24 (in the case of aromatic from 3 to 24) carbon atoms. Optionally, the hydrocarbon groups may be substituted with heteroatoms, typically oxygen. Examples of such monovalent hydrocarbon groups are alkyl, alkoxy, aryl, alkaryl or alkoxyaryl groups.

By alkylene is meant acyclic or cyclic alkylene groups having a carbon chain length of from $C_2$ to $C_{25}$. Examples of suitable alkylene groups are those derived from propene, butene, pentene, 1-decene, isoprene, myrcene and 1-heneicosene. By oxyalkylene is meant an alkylene group containing at least one ether oxygen atom and having a carbon chain length of from $C_2$ to $C_{25}$, preferably of from $C_2$ to $C_4$. Examples of suitable oxyalkylene groups are those associated with trimethylolpropane monoallylether, pentaerythritol monoallylether, trimethylolpropane diallylether, polyethoxylated allyl alcohol and polypropoxylated allyl alcohol. By alkylene aryl is meant an acyclic alkylene group containing at least one aryl group, preferably phenyl, and having an alkylene carbon chain length of from $C_2$ to $C_{25}$ The aryl group may optionally be substituted. Suitable substituent groups may include hydroxyl, benzyl, carboxylic acid and aliphatic groups. Examples of suitable alkylene aryl groups include styrene and 3-isopropenyl-α,α-dimethylbenzyl isocyanate.

Formulae (II) and (III) are diagrammatic, and it is not intended to imply that the parenthetical portions are necessarily blocks, although blocks may be used where desired. In many cases the compound is more or less random, especially when more than a few siloxane units are employed and when mixtures are used. In those instances where more than a few siloxane units are used and it is desired to form blocks, oligomers are first formed and then these are joined to form the block compound. By judicious choice of reactants, compounds having an alternating structure or blocks of alternating structure may be used.

Preferably, the curable composition comprises:
  (a) an organic polysiloxane containing reactive functional groups, the polysiloxane having the formula (II) or (III), where m, m', n, R, $R^a$ and X are as described above;
  (b) a polymer which contains reactive functional groups; and
  (c) a curing agent containing functional groups which are reactive with the functional groups of (a) and (b). In one preferred embodiment n+m and n+m' is 2 or 3.

It should be mentioned that when both (a) and (b) are present, the reactive functional groups of (a) and (b) can be the same or different, but both must be reactive with the functional groups of the curing agent. Examples of such reactive functional groups include OH, COOH, NCO, carboxylate, primary amine, secondary amine, amide, carbamate and epoxy functional groups.

The Polysiloxanes Containing Reactive Functional Groups

In one preferred embodiment of the invention, X is a moiety which contains OH functional groups. Preferably, when X contains OH functional groups, at least a portion of X is a group having the following structure:

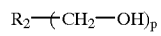
(V)

-continued

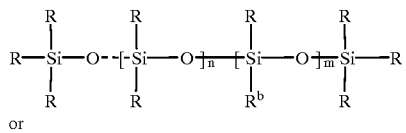

where $R_2$ is $CH_2 \!-\! C \!-\! R_3$ when p is 2 and $R_3$ is $C_1$ to $C_4$ alkyl, or

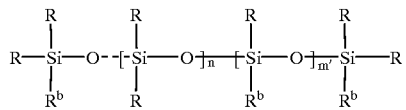

$R_2$ is $CH_2 \!-\! C \!-\!$ when p is 3.

More preferably, when X is a group having the formula (V), m is 2 and p is 2.

In one embodiment of the invention, X is a moiety which contains COOH functional groups. Preferably, when X is a group containing COOH functional groups, the organic polysiloxane is the reaction product of the following reactants:
  (a) a polysiloxane polyol having the following structure:

$$R-\underset{\underset{R}{|}}{\overset{\overset{R}{|}}{Si}}-O-[\underset{\underset{R}{|}}{\overset{\overset{R}{|}}{Si}}-O]_n-[\underset{\underset{R^b}{|}}{\overset{\overset{R}{|}}{Si}}-O]_m-\underset{\underset{R}{|}}{\overset{\overset{R}{|}}{Si}}-R \qquad (VII)$$

or $$R-\underset{\underset{R^b}{|}}{\overset{\overset{R}{|}}{Si}}-O-[\underset{\underset{R}{|}}{\overset{\overset{R}{|}}{Si}}-O]_n-[\underset{\underset{R^b}{|}}{\overset{\overset{R}{|}}{Si}}-O]_{m'}-\underset{\underset{R^b}{|}}{\overset{\overset{R}{|}}{Si}}-R \qquad (VIII)$$

where m is at least 1; m' is 0 to 50; n is 0 to 50; R is selected from the group consisting of H, OH and monovalent hydrocarbon groups connected to the silicon atoms; $R^b$ has the following structure:

$$R_1-O-Y \qquad (IX)$$

wherein $R_1$ is alkylene, oxyalkylene or alkylene aryl; and Y is H, mono-hydroxy substituted alkylene or oxyalkylene, or has the structure of formula (V) wherein p, $R_2$, and $R_3$ are as described above; and
  (b) at least one polycarboxylic acid or anhydride, preferably an anhydride.

Examples of anhydrides, suitable for use in the present invention as reactant (b) immediately above include hexahydrophthalic anhydride, methyl hexahydrophthalic anhydride, phthalic anhydride, trimellitic anhydride, succinic anhydride, chlorendic anhydride, alkenyl succinic anhydride and substituted alkenyl anhydrides such as octenyl succinic anhydride and mixtures thereof.

In yet another embodiment of the invention, X is a moiety which contains epoxy functional groups. Preferably, when X is a group containing epoxy functional groups, the organic polysiloxane is the reaction product of the following reactants:
  (a) a polysiloxane polyol having the structure of formula (VII) or (VIII), where m, m', n, R, $R^b$ and Y are as described above for these structures; and
  (b) at least one polyepoxide, preferably an aliphatic or cycloaliphatic polyepoxide, or mixtures thereof.

Examples of polyepoxides suitable for use in the present invention as reactant (b) immediately above are those well known in the art, such as those described in U.S. Pat. No. 4,681,811 at col. 4, line 52 to col. 5, line 50, hereby incorporated by reference.

In another embodiment of the invention, X is an oligomeric or polymeric urethane or urea-containing material which is terminated with NCO, OH, primary amine or secondary amine functional groups. When X is such a moiety, the organic polysiloxane is the reaction product of the following reactants:

(a) a polysiloxane polyol having the structure of formula (VII) or (VIII), where m, m', n, R, $R^b$ and Y are as described above for these structures;

(b) at least one polyisocyanate; and (c) optionally at least one compound having at least 2 active H atoms per molecule selected from the group consisting of hydroxyl, primary amine and secondary amine.

Examples of polyisocyanates suitable for use in the present invention as reactant (b) immediately above are commonly known in the art, such as those described in U.S. Pat. No. 4,046,729 at col. 5, line 26 to col. 6, line 28, hereby incorporated by reference. Preferred are aliphatic or cycloaliphatic diisocyanates, or mixtures thereof.

Examples of compounds having at least 2 active H atoms per molecule, are polyols and polyamines containing primary and/or secondary amines. Examples of polyols suitable for use in the present invention as reactant (c) immediately above are well known in the art, such as those described in U.S. Pat. No. 4,046,729 at col. 7, line 52 to col. 10, line 35, hereby incorporated by reference. Examples of polyamines suitable for use in the present invention as reactant (c) immediately above are well known in the art, such as those described in U.S. Pat. No. 4,046,729 at col. 6, line 61 to col. 7, line 32, and in U.S. Pat. No. 3,799,854 at col. 3, lines 13 to 50, both hereby incorporated by reference.

Reaction conditions and the ratio of the reactants (a), (b) and (c) are selected so as to form the desired terminal group.

In yet another embodiment of the invention, X is an oligomeric or polymeric ester-containing material which is terminated with OH or COOH functional groups. When X is such a group, the organic polysiloxane is the reaction product of the following reactants:

(a) a polysiloxane polyol having the structure of formula (VII) or (VIII), where m, m', n, R, $R^b$ and Y are as described above for these structures;

(b) at least one COOH containing group; and (c) at least one organic polyol.

Examples of COOH containing groups suitable for use in the present invention as reactant (b) immediately above are carboxylic acid group containing polymers well known in the art, such as those described in U.S. Pat. No. 4,681,811 at co. 6, line 38; col. 7, line 33; col. 7, line 47; and col. 8, line 2, hereby incorporated by reference. Preferred are aliphatic and cycloaliphatic polycarboxylic acids and mixtures thereof.

Examples of organic polyols suitable for use in the present invention as reactant (c) immediately above are polymeric polyols well known in the art, such as those described in U.S. Pat. No. 4,798,746 at col. 3, line 20 to col. 5, line 61, hereby incorporated by reference.

Reaction conditions and the ratio of the reactants (a), (b) and (c) are selected so as to form the desired terminal group.

The Curing Agents

Aminoplast resins and phenoplast resins and mixtures thereof, as curing agents for OH and COOH, amide and carbamate functional group containing materials are well known in the art. Examples of aminoplast and phenoplast resins suitable as curing agents in the curable compositions of the present invention are those described in U.S. Pat. No. 3,919,351 at col. 5, line 22 to col. 6, line 25, hereby incorporated by reference.

Polyisocyanates and blocked polyisocyanates as curing agents for OH and primary and/or secondary amino group containing materials are well known in the art. Examples of polyisocyanates and blocked isocyanates suitable for use as curing agents in the curable compositions of the present invention are those described in U.S. Pat. No. 4,546,045 at col. 5, lines 16 to 38; and in U.S. Pat. No. 5,468,802 at col. 3, lines 48 to 60, both hereby incorporated by reference.

Anhydrides as curing agents for OH and primary and/or secondary amino group containing materials are well known in the art. Examples of anhydrides suitable for use as curing agents in the curable compositions of the present invention are those described in U.S. Pat. No. 4,798,746 at col. 10, lines 16 to 50; and in U.S. Pat. No. 4,732,790 at col. 3, lines 41 to 57, both hereby incorporated by reference.

Polyepoxides as curing agents for COOH functional group containing materials are well known in the art. Examples of polyepoxides suitable for use as curing agents in the curable compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the curable compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides and esters and are well known in the art. Examples of said polyols are those described in U.S. Pat. No. 4,046,729 at col. 7, line 52 to col. 8, line 9; col. 8, line 29 to col. 9, line 66; and in U.S. Pat. No. 3,919,315 at col. 2, line 64 to col. 3, line 33, both hereby incorporated by reference.

Polyamines can also be used as curing agents for NCO functional group containing materials and for carbonates and unhindered esters and are well known in the art. Examples of polyamines suitable for use as curing agents in the curable compositions of the present invention are those described in U.S. Pat. No. 4,046,729 at col. 6, line 61 to col. 7, line 26, hereby incorporated by reference.

Polymers and Oligomers Containing Functional Groups

The curable coating compositions of the present invention can further include additional components such as hydroxyl or carboxylic acid-containing acrylic copolymers and hydroxyl or carboxylic acid-containing polyester polymers and oligomers and isocyanate or hydroxyl-containing polyurethane polymers, or amine or isocyanate-containing polyureas which can enhance cure rate, appearance and other physical properties of the cured coating.

The acrylic polymers, if used, are typically copolymers of acrylic acid or methacrylic acid or hydroxyalkyl esters of acrylic or methacrylic acid such as hydroxyethyl methacrylate or hydroxypropyl acrylate with one or more other polymerizable ethylenically unsaturated monomers such as alkyl esters of acrylic acid including methyl methacrylate and 2-ethyl hexyl acrylate, and vinyl aromatic compounds such as styrene, alpha-methyl styrene and vinyl toluene. The ratio of reactants and reaction conditions are selected to result in an acrylic polymer with pendant hydroxyl or carboxylic acid functionality.

Besides acrylic polymers, the curable coating composition of the present invention can contain a polyester polymer or oligomer. Such polymers may be prepared in a known manner by condensation of polyhydric alcohols and polycarboxylic acids. Suitable polyhydric alcohols include ethylene glycol, neopentyl glycol, trimethylol propane and pentaerythritol.

Suitable polycarboxylic acids include adipic acid, 1,4-cyclohexyl dicarboxylic acid and hexahydrophthalic acid. Besides the polycarboxylic acids mentioned above, functional equivalents of the acids such as anhydrides where they exist or lower alkyl esters of the acids such as the methyl esters may be used. Also, small amounts of monocarboxylic acids such as stearic acid may be used.

Hydroxyl-containing polyester oligomers can be prepared by reacting an anhydride of a dicarboxylic acid such as hexahydrophthalic anhydride with a diol such as neopentyl glycol in a 1:2 molar ratio.

Where it is desired to enhance air-drying, suitable drying oil fatty acids may be used and include those derived from linseed oil, soya bean oil, tall oil, dehydrated castor oil or tung oil.

The polyesters are made to contain free terminal hydroxyl and/or carboxyl groups which are available for further crosslinking reactions.

Polyurethane polymers containing terminal isocyanate or hydroxyl groups may also be used. The polyurethane polyols or NCO-terminated polyurethanes which can be used are those prepared by reacting polyols including polymeric polyols with polyisocyanates. The polyurea-containing terminal isocyanate or primary or secondary amine groups which can be used are those prepared by reacting polyamines including polymeric polyamines with polyisocyanates. The hydroxyl/isocyanate or amine/isocyanate equivalent ratio is adjusted and reaction conditions selected to obtain the desired terminal group. Examples of suitable polyisocyanates are those described in U.S. Pat. No. 4,046,729 at column 5, line 26 to column 6, line 28, hereby incorporated by reference. Examples of suitable polyols are those described in U.S. Pat. No. 4,046,729 at column 7, line 52 to column 10, line 35, hereby incorporated by reference. Examples of suitable polyamines are those described in U.S. Pat. No. 4,046,729 at column 6, line 61 to column 7, line 32 and in U.S. Pat. No. 3,799,854 at column 3, lines 13 to 50, both hereby incorporated by reference.

The coating compositions of the invention can be pigmented or unpigmented. Suitable pigments for color coats include opaque, transparent and translucent pigments generally known for use in coating applications. When pigment is used, it typically present in the composition in amounts such that the pigment to binder ratio is from about 0.03 to 6.0:1.

In addition to the foregoing components, the coating compositions of the invention may include one or more optional ingredients such as plasticizers, anti-oxidants, light stabilizers, mildewcides and fungicides, surfactants and flow control additives or catalysts as are well known in the art.

The components present in the curable coating composition of the present invention generally are dissolved or dispersed in an organic solvent. Organic solvents which may be used include, for example, alcohols, ketones, aromatic hydrocarbons, glycol ethers, esters or mixtures thereof.

As aforementioned, the curable compositions are particularly useful as coating compositions. Whether the coating compositions are cured at ambient or thermal conditions is dependent upon the reactive functional groups of the organic polysiloxane component, the optional polymer or oligomer and the curing agent component. The curable compositions of the invention can be pigmented or unpigmented.

Suitable pigments for color coats include opaque, transparent and translucent pigments generally known for use in coating applications. Examples include titanium dioxide, zinc oxide, antimony oxide, iron oxide, carbon black and phthalocyanine blue. Metallic pigments such as aluminum flake and metal oxide-coated micas can also be used. The coatings may also contain extender pigments such as calcium carbonate, clay, silica, talc, etc. When pigment is used, it typically present in the composition in amounts such that the pigment to binder ratio is from about 0.03 to 6.0:1.

In addition to the foregoing components, the coating compositions of the invention may include one or more optional ingredients such as plasticizers, anti-oxidants, light stabilizers, mildeweides and fungicides, surfactants and flow control additives and suitable catalysts as are well known in the art.

The components present in the curable coating composition of the present invention generally are dissolved or dispersed in an organic solvent. Organic solvents which may be used include, for example, alcohols, ketones, aromatic hydrocarbons, glycol ethers, esters or mixtures thereof. In solvent-based coating compositions, organic solvent is typically present in amounts of 5 to 80 percent by weight based on total weight of the composition.

The functional group containing polysiloxane is generally present in the curable coating composition of the present invention in amounts of 5 to about 95, and preferably from about 10 to about 70 percent by weight based on total weight of resin solids. The curing agent is generally present in amounts of from 5 to about 95 and preferably from about 10 to about 90 percent by weight based on total weight of resin solids. Optional acrylic or polyester polymers can be present in amounts up to 70 and preferably from about 10 to about 60 percent by weight based on total weight of resin solids.

The coating composition of the invention can be applied to the substrate by any conventional method such as brushing, dipping, flow coating, roll coating, conventional spraying and electrostatic spraying. Typically, they are most often applied by spraying. Usual spray techniques and equipment for air spraying and electrostatic spraying and either manual or automatic methods can be used.

The compositions can be applied by conventional methods over a wide variety of primed and unprimed substrates such as wood, metal, glass, cloth, leather, plastics, foams and the like; however, they are particularly useful over metal substrates.

The ambient temperature curable compositions such as those using polyisocyanate or polyanhydride curing agent can be cured at elevated temperatures to hasten the cure. An example would be forced air curing in a down draft booth at about 40° to 60° C. which is common in the automotive refinish industry. The ambient temperature curable compositions are usually prepared as a two (2) package system in which the curing agent is kept separate from the polysiloxane containing the reactive functional group. The packages are combined shortly before application.

The thermally curable compositions such as those using blocked isocyanate, aminoplast, phenoplast, polyepoxide or polyacid curing agent can be prepared as a one package system.

The thermally curable coating compositions are cured at elevated temperatures, typically for 1 to 30 minutes at about 250° F. to about 450° F. (121 ° C. to 232° C.) with temperature primarily dependent upon the type of substrate used. Dwell time (i.e., time that the coated substrate is exposed to elevated temperature for curing) is dependent upon the cure temperature used as well as wet film thickness of the applied coating composition. For example, coated automotive elastomeric parts require a long dwell time at a lower cure temperature (e.g., 30 minutes/250° F. (121° C.)), while coated aluminum beverage containers require a very short dwell time at a very high cure temperature (e.g., 1 minute/375° F. (191° C.)).

The coating compositions of the invention are particularly useful as primers and as color and/or clear coats in color-clear composite coatings. The compositions of the invention in the pigmented form can be applied directly to a substrate to form a color coat. The color coat may be in the form of a primer for subsequent application of a top coat or may be a colored top coat. Alternately, the coating composition of the invention can be unpigmented, in the form of a clear coat for application over a color coat (either a primer coat or a colored top coat). When used as a primer coating, thicknesses of 0.4 to 4.0 mils are typical. When used as a color top coat, coating thicknesses of about 0.5 to 4.0 mils are usual, and when used as a clear coat, coating thicknesses of about 1.5 to 4.0 mils are generally used.

In applying composite coatings using the coating composition of the present invention, the initially applied coating can be cured prior to the application of the second coat. Alternatively, the coating can be applied by a wet-on-wet technique in which the second coating is applied to the first coating (usually after a flash time at room temperature or slightly elevated temperature to remove solvent or diluent, but insufficient time to cure the coating) and the two coatings are co-cured in a single step.

Only one of the coatings in the composite coating needs to be based on the coating composition of the present invention. The other coating composition can be based on a film-forming system containing a thermoplastic and/or thermosetting film-forming resin well known in the art such as cellulosics, acrylics, polyurethanes, polyesters including alkyds, aminoplasts, epoxies and mixtures thereof. These film-forming resins are typically formulated with various other coatings ingredients such as pigments, solvents and optional ingredients mentioned above.

The following examples illustrate the invention and should not be construed as a limitation on the scope thereof. Unless specifically indicated otherwise, all percentages and amounts are by weight.

EXAMPLES

Examples 1 through 6 describe the preparation of various polysiloxanes polyols useful in the present invention. Example 7 and Comparative Example 8 describe, respectively, the preparation of clearcoat compositions containing the polysiloxane polyol of Example 1 and a comparative coating containing only a polyester polyol with no polysiloxane polyol. The following Table 1 illustrates advantages in coating properties such as tack-time, pot-life and solvent resistance derived from the use of the polysiloxane polyol. Example 9 and Comparative Example 10 describe, respectively, the preparation of a clearcoat composition containing the polysiloxane polyol of Example 1 used in the composition at an additive level, i.e., less than 10 per cent based on total resin solids, and a comparable clearcoat composition containing no polysiloxane polyol. The following Table 2 illustrates advantages in mar resistance of the clearcoat composition derived from the use of the polysiloxane polyol at an additive level. Example 11 describes the preparation of clearcoat compositions containing the polysiloxane polyol of Example 2 (compositions 11B, 11C, and 11D) and a comparative composition, 11A, containing no polysiloxane polyol. Each of the compositions contained an aminoplast curing agent and were thermally cured. The following Table 3 illustrates the advantages in mar resistance of the clearcoat compositions derived from the use of the polysiloxane composition. Example 12 describes the curing of a polysiloxane containing COOH—functional groups with a polyepoxide curing agent. Example 13 describes the preparation of clearcoat compositions containing the polysiloxane polyols of Examples 5 and 6 and an aminoplast curing agent. The coatings were evaluated for Distinctness of Image (DOI), gloss, mar resistance and acid etch resistance. The results are reported in the following Table 4. For the purposes of comparison, commercial clearcoat compositions based on acrylic polyol-aminoplast cure and on epoxy-acid cure are also reported.

Example 1

This example describes the preparation of a disiloxane tetrol, a product of the hydrosilylation of tetramethyldisiloxane with an alkenyl polyoxyalkylene alcohol. The disiloxane tetrol was prepared from the following mixture of ingredients:

| Ingredients | Equivalent Weight | Equivalents | Parts By Weight (grams) |
|---|---|---|---|
| Charge I: Trimethylolpropane monoallylether | 174.0 | 7.7 | 1335.7 |
| Charge II: 1,1,3,3-tetramethyl-disiloxane | 67.0 | 7.7 | 515.2 |
| Charge III: Chloropatinic acid | | | 10 ppm |

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example 2

This example describes the preparation of polysiloxane tetrol, a product of the hydrosilylation of MASILWA™ BASE siloxane with an approximate degree of polymerization of 3 to 4, i.e., (Si—O)$_3$ to (Si—O)$_4$. The siloxane, tetrol was prepared from the following mixture of ingredients:

| Ingredients | Equivalent Weight | Equivalents | Parts By Weight (grams) |
|---|---|---|---|
| Charge I: Trimethylolpropane monoallylether | 174.0 | 9.4 | 1630.0 |
| Charge II: MASILWAX BASE[1] | 156.7[2] | 9.4 | 1467.4 |
| Charge III: Chloroplatinic acid | | | 10 ppm |

[1]Polysiloxane-containing silicon hydride, commercially available from PPG Industries, Inc.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example 3

This example describes the preparation of a styrenated polysiloxane polyol, a product of the hydrosilylation of a polysiloxane with an approximate degree of polymerization of 34, i.e., (Si—O)$_{34}$. The polysiloxane polyol was prepared from the following mixture of ingredients:

| Ingredients | Equivalent Weight | Equivalents | Parts By Weight (grams) |
|---|---|---|---|
| Charge I: | | | |
| Alpha-methylstyrene | 118.0 | 2.3 | 272.9 |
| Polysiloxane (Si-O)$_{34}$[1] | 162.2 | 3.1 | 501.5 |
| Charge II: Trimethylolpropane monoallylether | 174.0 | .97 | 168.0 |

[1]Polysiloxane (Si-O)$_{34}$ containing silicon hydride.

To a suitable reaction vessel equipped with a means for maintaining a nitrogen blanket, Charge I was added at ambient conditions, followed by the addition of 135 microliters, 7.5% solution of chloroplatinic acid, equivalent to 10 ppm of active platinum based on total monomer solids. The temperature was gradually increased to 80° C. under a nitrogen blanket. The reaction was then allowed to exotherm to 151° C., then subsequently cooled back to 80° C., at which time Charge II was added with 70 ppm of potassium acetate. The reaction was again allowed to exotherm to approximately 150° C. before cooling to and maintaining at 95° C. while monitoring by infrared spectroscopy for disappearance of the silicon hydride absorption band (Si—H, 2150 cm$^{-1}$).

Example 4

This example describes the preparation of a polysiloxane polyol, a product of the hydrosilylation of a Si—H functional polysiloxane with an approximate degree of polymerization of 40, i.e., (Si—O)$_{40}$. The polysiloxane polyol was prepared from the following mixture of ingredients:

| Ingredients | Equivalent Weight | Equivalents | Parts By Weight (grams) |
|---|---|---|---|
| Charge I: | | | |
| Trimethylolpropane monoallylether | 174.0 | 0.90 | 155.9 |
| Tetraethoxyallyl alcohol | 251.8[1] | 0.90 | 225.6 |
| Charge II: Polysiloxane pre-polymer (Si-O)$_{40}$ | 158.48 | 1.38 | 218.46 |
| Charge III: Chloroplatinic acid, 7.5% in i-propanol | | | 2 × 2.5 ppm |

[1]Equivalent weight based on iodine value. The material had an equivalent weight based on hydroxyl analysis of 244.5 g/mol OH.

To a suitable reaction vessel equipped with a means for maintaining a nitrogen blanket, Charge I and an amount of potassium acetate equivalent to 50 ppm of total monomer solids was added at ambient conditions and the temperature was gradually increased to 80° C. under a nitrogen blanket. At that temperature, about 10% of Charge II was added under agitation, followed by the addition of Charge III, equivalent to 2.5 ppm of active platinum based on total monomer solids. The reaction was then allowed to exotherm to 85° C. at which time the remainder of Charge II was added at a rate such that the temperature did not exceed 85.5° C. After completion of this addition, a second charge of chloroplatinic acid equivalent to 2.5 ppm of active platinum based on total monomer solids was added and a minor additional exotherm was observed. The reaction temperature was maintained at 80° C. for eight hours and monitored by silver nitrate testing for the presence of Si—H.

Example 5

This example describes the preparation of a polysiloxane polyol, a product of the hydrosilylation of a Si—H functional polysiloxane with an approximate degree of polymerization of 55: (Si—O)$_{55}$, with a mixture of alpha-methyl styrene, trimethylolpropane monoallylether, and a four mole ethoxylate of allyl alcohol. The polysiloxane polyol was prepared from the following mixture of ingredients:

| Ingredients | Equivalent Weight | Equivalents | Parts By Weight (grams) |
|---|---|---|---|
| Charge I: | | | |
| Polysiloxane | 104.4 | 4.79 | 500 |
| Alpha-methyl styrene | 118.18 | 1.96 | 232.1 |
| Chloroplatinic acid, 7.5% in i-propanol | | | 2.5 ppm |
| Charge II: | | | |
| Tetraethoxy allylether | 251.8[1] | 1.84 | 462.6 |
| Trimethylolpropane monoallylether | 174.0 | 1.84 | 320.1 |

[1]Equivalent weight from iodine value. The material had an equivalent weight by hydroxyl value of 229.5 mg/mol indicating the presence of some ethylene glycol.

To a suitable reaction vessel equipped with a means for maintaining a nitrogen blanket, Charge I was heated under a nitrogen blanket to 30° C. An exotherm brought the temperature up to about 50° C. at which point further gentle heating induced an exotherm to about 140° C. After cooling to 85° C. an amount of potassium acetate equivalent to 50 ppm of total solids was added to Charge II and Charge II was then added under agitation. The rate of addition was set such that the reaction temperature remained between 93 and 96° C. As the addition proceeded, the reaction began to cool and an additional charge of chloroplatinic acid equivalent to 1.0 ppm platinum based on total monomer weight was added. The reaction exhibited a secondary exotherm to 97° C. at which time the remainder of Charge II was added. The reaction temperature was maintained at 85° C. for two hours and monitored by silver nitrate testing for the disappearance of Si—H.

Example 6

This example describes the preparation of a polysiloxane polyol, a product of the hydrosilylation of a Si—H functional polysiloxane with an approximate degree of polymerization of 40: $(Si-O)_{40}$, with a four mole butoxylate of allyl alcohol. The polysiloxane polyol was prepared from the following mixture of ingredients:

| Ingredients | Equivalent Weight | Equivalents | Parts By Weight (grams) |
|---|---|---|---|
| Charge I: Tetrabutoxy allylether | 338[1] | 1.30 | 446.2 |
| Charge II: Polysiloxane | 162.77 | 1.00 | 162.3 |
| Charge III: Chloroplatinic acid, 7.5% in i-propanol | | | 2 × 2.5 ppm |

[1]Equivalent weight from iodine value. The material had an equivalent weight by hydroxyl value of 322 mg/mol indicating the presence of some butylene glycol.

To a suitable reaction vessel equipped with a means for maintaining a nitrogen blanket, Charge I and an amount of potassium acetate equivalent to 50 ppm of total monomer solids were added at ambient conditions and the temperature was gradually increased to 80° C. under a nitrogen blanket. At that temperature, about 10% of Charge II was added under agitation, followed by the addition of Charge III, equivalent to 2.5 ppm of active platinum based on total monomer solids. The reaction was then allowed to exotherm to 85° C. at which time the remainder of Charge II was added at a rate such that the temperature did not exceed 85.5° C. After completion of this addition, a second charge of chloroplatinic acid equivalent to 2.5 ppm of active platinum based on total monomer solids was added and a minor additional exotherm to about 92° C. was observed. The reaction temperature was maintained at 85° C. for eight hours and monitored by silver nitrate testing for the disappearance of Si—H.

Example 7

This example describes the preparation of a two component clearcoat composition containing the polysiloxane polyol of Example 1. This clearcoat composition is curable at ambient conditions and suitable for automotive refinish applications. The ingredients of Component 1, which contains the polysiloxane polyol, and Component 2, which contains an isocyanate curing agent, were co-blended under mild agitation just before spray application.

| Ingredients | Formula Weight (grams) | Weight Resin Solids (grams) |
|---|---|---|
| Component 1 | | |
| Polysiloxane polyol of Example 1 | 27.2 | 27.2 |
| Siliconized polyester polyol[1] | 10.0 | 10.0 |
| Reactive diluent[2] | 4.9 | 4.9 |
| Surface active agent[3] | 0.46 | 0.46 |
| Ultraviolet light absorber[4] | 1.57 | 1.49 |
| Hindered amine light stabilizer[5] | 0.92 | 0.92 |
| Hexyl acetate[6] | 3.69 | — |
| Ethylene glycol butyl ether acetate[7] | 2.94 | — |
| Methyl amyl ketone | 5.57 | — |
| Ethyl-3-ethoxy propionate[8] | 3.69 | — |
| Catalyst[9] | 0.13 | 0.13 |
| Component 2 | | |
| Isocyanate curing agent[10] | 77.69 | 65.49 |
| Enhancer[11] | 5.88 | 0.12 |
| Total | 144.62 | 110.71 |

[1]The siliconized polyester polyol comprised of polysiloxane polyol of Example 1, trimethylolpropane, isostearic acid, 1,4-cyclohexyl dicarboxylic acid in a 11.5/33.7/20.5/34.2 weight ratio.
[2]Oxazolidine commercially available as ZOLDINE RD-20LC from Angus Chemical.
[3]Polysiloxane commercially available as BYK-331 from BYK Chemie USA.
[4]Commercially available as TINUVIN 384 from Ciba-Geigy Corp.
[5]Sterically hindered tertiary amine light stabilizer commercially available as TINUVIN 123 from Ciba-Geigy Corp.
[6]Commercially available as EXXATE 600 from EXXON Chemical Co.
[7]Commercially available as EKTASOLVE EB from Eastman Chemical Co.
[8]Commercially available as EKTASOLVE EEP from Eastman Chemical Co.
[9]Commercially available as METACURE T-12 from Air Products and Chemicals, Inc.
[10]Blend of hexamethylene diisocyanate trimer and the isocyanurate of isophorone diisocyanate available as DCX-61 from PPG Industries, Inc.
[11]A 2% active solution of 2,4-pentanedione commercially available from PPG Industries, Inc. as DX-84.

Comparative Example 8

By way of comparison with Example 7, this example describes the preparation of a two component clearcoat composition containing a polyester polyol with no polysiloxane polyol. The ingredients of Component 1 and Component 2, which contains an isocyanate curing agent, were co-blended under mild agitation just before spray application.

| Ingredients | Formula Weight (grams) | Weight Resin Solids (grams) |
|---|---|---|
| Component 1 | | |
| Polyester polyol resin[1] | 38.63 | 34.73 |
| Reactive diluent ZOLDINE RD-20LC | 4.9 | 4.9 |
| BYK-331 | 0.46 | 0.46 |
| TINUVIN 384 | 1.57 | 1.49 |
| TINUVIN 123 | 0.92 | 0.92 |
| Hexyl acetate | 3.32 | — |
| Ethylene glycol butyl ether acetate | 2.65 | — |
| Methyl amyl ketone | 5.02 | — |
| Ethyl-3-ethoxy propionate | 3.32 | — |
| METACURE T-12 | 0.13 | 0.13 |

-continued

| Ingredients | Formula Weight (grams) | Weight Resin Solids (grams) |
|---|---|---|
| Component 2 | | |
| Isocyanate curing agent used in Example 7 | 67.16 | 56.36 |
| Enhancer used in Example 7 | 5.88 | 0.1 |
| Total | 133.98 | 99.1 |

[1] Condensate of trimethylolpropane, isostearic acid and 1,4-cyclohexyl dicarboxylic acid (37.2/38.5/24.3 weight ratio); 90% solids in methyl amyl ketone.

APR24711 test panels, available from ACT Laboratories (32 gauge cold rolled steel, coated with ED5000, an electrodepositable primer coating commercially available from PPG Industries, Inc.) were prepared by spray applying a second primer coat (GPX-5379 from PPG Industries, Inc.) and curing at ambient conditions. An acrylic basecoat, commercially available as DELTRON® Universal Basecoat from PPG Industries, Inc., was spray applied to primed panels using conventional spray equipment and allowed to flash at ambient conditions for 20 minutes. The clearcoat compositions of Example 7 and Comparative Example 8 were then spray applied to the basecoat using conventional spray equipment. The clearcoated test panels were then allowed to cure at ambient conditions for one week prior to testing.

To evaluate pot-life of the two-component clearcoats, Brookfield viscosities, reported in centistokes per second (cps), were measured using a #3 spindle at 60 revolutions per minute, immediately after the two components were co-blended and again after one hour. Tack time, that is the time from initial spray application to the test panel to the time at which the applied coating is no longer sticky or tacky to the touch, was measured for each of the clearcoat compositions of Example 7 and Comparative Example 8. The 20 degree gloss was measured after one week cure at ambient temperatures using a Glossgard IIa gloss meter from Pacific Scientific. Gasoline resistance was measured after one week cure at ambient cure by soaking the coated panels in 93 octane gasoline for 3 minutes and rating the coatings for softening of the film and marring. Results for the above-mentioned tests are reported in the following Table 1.

TABLE 1

| Clearcoat Composition | Tack-free Time (min) | Brookfield Viscosity 0 hr./1 hr. (cps) | 20 Degree Gloss | Gasoline Resistance |
|---|---|---|---|---|
| Example 7 | 60 | 75/180 | 82 | no change; no gloss loss |
| Example 8 (comparative) | 90 | 87.5/360 | 84 | slight mar; some gloss loss |

[1] Polyether modified dimethyl polysiloxane copolymer, commercially available as BYK 300 from BYK Chemie USA.

[2] Dibutyl tin dilaurate.

[3] 2-(2'-hydroxy-3',5'-ditert-amylphenyl) benzotriazole, commercially available as TINUVIN 328 from Ciba-Geigy Corp.

[4] Sterically hindered tertiary amine light stabilizer commercially available as TINUVRN 123 from Ciba-Geigy Corp.

[5] Propylene glycol monomethyl ether acetate commercially available as ARCOSOLV PM ACETATE from Arco Chemical Co.

[6] Hexamethylene diisocyanate trimer commercially available as HDT-LV from Rhone Poulenc, Inc.

[7] Formed from styrene, hydroxypropyl acrylate, isostearic acid, glycidyl methacrylate and methyl methacrylate (32.4/23.3/22.4/11.2/10.7 weight ratio in xylene.

[8] Blend of low boiling aliphatic solvents from Ashland Chemical.

[9] Blend of medium boiling aliphatic solvents from Ashland Chemical.

Comparative Example 10

By way of comparison with Example 9, this example describes the preparation of a two component clearcoat composition containing no polysiloxane polyol at an additive level. The ingredients of Component 1 and Component 2, which contains an isocyanate curing agent, were co-blended under mild agitation just before spray application.

| Ingredients | Formula Weight (grams) | Weight Resin Solids (grams) |
|---|---|---|
| Component 1 | | |
| Methyl amyl ketone | 8.28 | — |
| Xylene | 8.75 | — |
| BYK-300 | 0.34 | 0.17 |
| Dibutyltin dilaurate | 0.04 | 0.04 |
| TINUVIN 328 | 1.01 | 1.01 |
| TINUVIN 123 | 0.50 | 0.50 |
| Polyester polyol used in Example 9 | 14.12 | 12.71 |
| Acrylic polyol used in Example 9 | 50.40 | 28.5 |
| Methyl ethyl ketone | 6.76 | — |
| Lactol spirits | 2.09 | — |
| Toluene | 3.80 | — |
| Glycol ether acetate | 4.69 | — |
| VM&P Naphtha | 3.48 | — |
| 2,4-Pentanedione | 5.21 | — |
| Dibutyltin dilaurate | 0.09 | 0.09 |
| Component 2 | | |
| HDT-LV | 50.50 | 50.50 |
| Methyl isobutyl ketone | 11.45 | — |
| Total | 171.51 | 93.52 |

APR24711 test panels were prepared by spray applying a pigmented basecoat commercially available as DELTRON DBU 9700 from PPG Industries, Inc. and allowing the basecoat to flash cure at ambient conditions for 20 minutes. The clearcoat compositions of Example 9 and Comparative Example 10 were then spray applied using conventional spray equipment and allowed to cure at ambient conditions for one week prior to testing.

Panels were tested for 20 degree gloss, pencil hardness, adhesion, gasoline resistance and mar resistance. The 20 degree gloss was measured as in Example 7; pencil hardness was measured in accordance with ASTM D3363-92a; adhesion was measured in accordance with ASTM D3359; gasoline resistance was determined as in Example 7. Mar resistance was determined by marring coated panels with a wool felt cloth moving across an abrasive powder which has been applied to the surface of the coating. Gloss measurements are made on marred and unmarred areas and the mar resistance is determined as percent retention of the original gloss. The basic apparatus for testing for mar resistance is an Atlas AATCC Mar Tester Model CM-5 available from Atlas Electrical Devices Company. The abrasive powder which is used is commercially available Bon-Ami brand (Feldspar/Calcite). The Bon-Ami cleanser is applied to approximately one-half of the coated panel. Excess cleanser is removed so only a thin film of cleanser remains on the panel. Using the mar tester, the cleanser-coated panel is rubbed with a wool cloth ten times (10 double rubs). After marring, the panel is washed with water to remove the cleanser, then the panel is dried with a paper cloth. The 20 degree gloss is measured in several places on both the marred and unmarred areas of the painted surface. The maximum and minimum gloss values are taken and the mar resistance is determined as follows:

$$\text{Mar Resistance} = \frac{\text{marred gloss}}{\text{original gloss}} \times 100$$

The higher the value, the better the mar resistance.

Results of the above-mentioned testing are reported in the following Table 2.

TABLE 2

| Clearcoat Composition | 20 Degree Gloss | Pencil Hardness | Adhesion (5 = 100%) | Gasoline Resistance | Mar Resistance |
|---|---|---|---|---|---|
| Example 9 | 86 | HB | 5 | No effect | 86% |
| Example 10 (comparative) | 86 | HB | 5 | No effect | 78% |

Example 11

This example describes the preparation of clearcoat compositions containing a polysiloxane and cured with an aminoplast curing agent. Compositions 11B, 11C and 11D contain various levels of the polysiloxane polyol of Example 2 and a comparative clearcoat composition, 11A, contains no polysiloxane polyol. Primed panels were prepared by spray applying a pigmented basecoat commercially available as HWB-S-9517 from PPG Industries, Inc., using conventional spray equipment and curing the basecoated panels for 25 minutes at 285° F. (141° C.). The ingredients of each clear coat composition were thoroughly mixed prior to application. Each composition was drawn down using a 10 mil draw bar over the cured basecoat and the clearcoated panels were thermally cured for 25 minutes at 275° F. (135° C.).

| Ingredients | Composition 11A (grams) (comparative) | Composition 11B (grams) | Composition 11C (grams) | Composition 11D (grams) |
|---|---|---|---|---|
| Methyl amyl ketone | 3.0 | 4.1 | 5.1 | 7.3 |
| Polysiloxane polyol of Example 2 | — | 8.1 | 5.4 | 6.5 |
| OH functional acrylic[1] | 10.8 | 1.6 | 3.3 | — |
| Aminoplast curing agent[2] | 4.4 | 4.4 | 4.4 | 4.4 |
| Polybutyl-acrylate[3] | 0.07 | 0.07 | 0.07 | 0.07 |
| Catalyst[4] | 0.13 | 0.13 | 0.13 | 0.13 |

-continued

| Ingredients | Composition 11A (grams) (comparative) | Composition 11B (grams) | Composition 11C (grams) | Composition 11D (grams) |
|---|---|---|---|---|

[1]Styrene/lauryl methacrylate/hydroxyethyl methacrylate/2-ethylhexyl methacrylate/methylacrylic acid/butyl acrylate/α-methylstyrene dimer polymer (35:34.2 :22: 5.2: 3.4: 0.1: 0.1), 60 percent solids in xylene and mineral spirits (95:5), with a hydroxyl equivalent weight of 591.6 based on resin solids.
[2]Commercially available as CYMEL 202 from Cytec, Inc.
[3]Flow control agent, 62% solids in xylene, molecular weight = 6700.
[4]Phenyl acid phosphate.

The cured test panels were tested for gloss and mar resistance as described in Example 9. Results for these tests are reported in the following Table 3.

TABLE 3

| Composition | 20 Degree Gloss | Marred Gloss (averaged) | Mar Resistance |
|---|---|---|---|
| 11A (comparative) | 95.1 | 79.7 | 83.8% |
| 11B | 92.9 | 90.75 | 97.7% |
| 11C | 89.5 | 86.2 | 96.3% |
| 11D | 85.4 | 85.4 | 100% |

Example 12

This example describes the preparation of a polysiloxane containing COOH functional groups, a product of the polysiloxane polyol of Example 2, with an approximate degree of polymerization of 3 to 4, i.e., $(Si-O)_3$ to $(Si-O)_4$, and a polycarboxylic anhydride. The polysiloxane having COOH functional groups was prepared from the following mixture of ingredients:

| Ingredients | Equivalent Weight | Equivalents | Parts By Weight (grams) |
|---|---|---|---|
| Charge I: Polysiloxane polyol of Example 2 | 183.9 | 14.519 | 2670.0 |
| Charge II: Hexahydrophthalic anhydride | 154.0 | 14.519 | 2235.93 |

To a suitable reaction vessel, equipped with a means for maintaining a nitrogen blanket, Charge I was added at ambient temperature and heated to 125° C. under a nitrogen blanket. Charge II was added dropwise, under mild agitation. Temperature was held at 125° C. to a stalled acid value, and the disappearance of anhydride as followed by IR spectroscopy.

A 50 percent by weight solution of the COOH functional polysiloxane in butyl acetate was blended with an oxirane functional copolymer (glycidyl methacrylate, butyl methacrylate, styrene and methyl styrene dimer (60/30/7/2/1 weight ratio)) in a ratio of one equivalent acid to one equivalent oxirane. To this resin blend was added 3 percent by weight based on weight of resin solids oxyethyl triphenyl phosphonium iodide catalyst. The resulting curable composition was drawn down with a 10 mil draw bar over a cold rolled steel panel and cured at 220° F. (104° C.) for 30 minutes. The cured coating was clear, glossy and colorless; having good mar resistance and good solvent resistance to methyl ethyl ketone.

Example 13

This Example describes the preparation of clearcoat compositions containing relatively high molecular weight polysiloxane polyols and cured with an aminoplast curing agent. Primed cold rolled steel panels were prepared by spray applying a pigmented basecoat commercially available from PPG Industries, Inc. as DCT-6373 using conventional spray equipment and flash curing the basecoated panels for 10 minutes at 200° F. (93° C.). The ingredients of each of the clear compositions were thoroughly mixed prior to application. Each composition was spray applied using conventional spray equipment, flashed at ambient temperature for 15 minutes before being baked at 285° F. (141° C.). for 25 minutes. The cured clearcoats were measured for Distinctness of Image, 20 degree gloss, mar resistance and acid etch resistance. Commercial clearcoats were also evaluated and the results are reported In Table 4 below.

The clearcoat formulation containing the polysiloxane polyols was prepared by mixing together the following ingredients and reducing to spray viscosity (25 seconds, No. 4 Ford cup) with methyl amyl ketone:

| Ingredients | Formula Weight (grams) | |
| --- | --- | --- |
| SOLVESSO 100[1] | 40.0 | 40.0 |
| TINUVIN 328 | 3.0 | 3.0 |
| TINUVIN 900 | 3.0 | 3.0 |
| TINUVIN 123 | 1.2 | 1.2 |
| TINUVIN 292 | 0.8 | 0.8 |
| CYMEL 1130 | 70.0 | 70.0 |
| Polybutylacrylate as in Example 11 | 1.34 | 1.34 |
| Diisopropylamine blocked dodecylbenzene sulfonic acid catalyst | 6.66 | 6.66 |
| Polysiloxane polyol of Example 5 | 130 | |
| Polysiloxane polyol of Example 6 | | 130 |

[1]Blend of aromatic solvents available from Exxon Chemical Co.

TABLE 4

| Polysiloxane of Example No. | DOI[1] | 20° Gloss[2] | Mar Resistance[3] | Acid Etch Resistance[6] |
| --- | --- | --- | --- | --- |
| 5 | 97 | 87.5 | 95.0% | 7.5 |
| 6 | 98 | 80.3 | 47.9% | 10 |
| DCT 1002B[4] | 97 | 91.6 | 73.2% | 9 |
| DCT 5002PSH[5] | 86 | 83.3 | 21.2% | 2.5 |

[1]Distinctness of Image (DOI) using a Dorigon II DOI meter. 100, i.e., like a mirror.
[2]Measured as in Example 7.
[3]Measured as in Example 9.
[4]Acrylic polyol-aminoplast cure clearcoat available from PPG Industries, Inc.
[5]Epoxy-acid cure clearcoat available from PPG Industries, Inc.
[6]A solution of 298 parts deionized water and 15 parts of 0.2 N sulfuric acid was prepared. The acid solution was spotted onto 2 × 4 inch panels with a total of eight (8) spots, 50 microliters each. The panels were then placed in an oven at 120° F. (49° C.) for twenty minutes. The panels were removed from the oven and the spot/bake procedure was repeated two more times to give a total of 60 minutes at 120° F. (49° C.). After the third cycle, the panels were washed with soap and water and dried, then rated for acid etch resistance on a scale of 0–10 based on standard test panels (0 = no observable etch; 10 = severe etching).

What is claimed is:

1. A curable composition comprising:
  (a) an organic polysiloxane containing reactive functional groups, said polysiloxane having the following general structural formula:

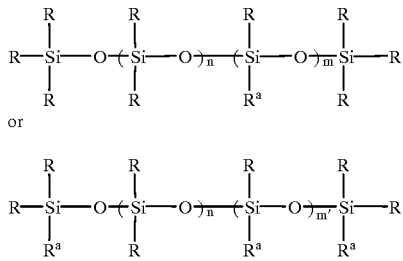

or

where m is at least 1; m' is 0 to 50; n is 0 to 50; R is selected from the group consisting of H, OH and monovalent hydrocarbon groups connected to the silicon atoms; $R^a$ has the following structure:

$$R_1 - O - X$$

wherein $R_1$ is alkylene, oxyalkylene or alkylene aryl; and X is a moiety containing an amide functional group; and (b) a curing agent which contains functional groups reactive with the amide functional groups of (a).

2. A curable composition comprising:
  (a) an organic polysiloxane, which contains reactive functional groups, said polysiloxane having the following formula:

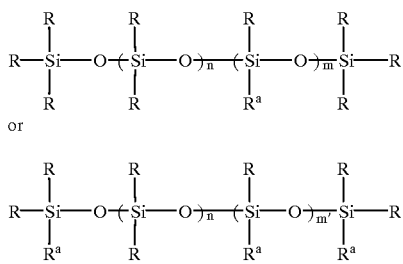

or

where m is at least 1; m' is 0 to 50; n is 0 to 50; R is selected from the group consisting of H, OH and monovalent hydrocarbon groups connected to the silicon atoms; $R^a$ has the following structure:

$$R_1 - O - X$$

wherein $R_1$ is alkylene, oxyalkylene or alkylene aryl; and X is a moiety containing an amide functional group;

(b) a polymer or oligomer which contains reactive functional groups; and (c) a curing agent containing functional groups which are reactive with the amide functional groups of (a) and the functional groups of (b).

3. The curable composition of claim 2 wherein n+m and n+m' is 2 or 3.

4. The curable composition of claim 2 wherein the curing agent is an aminoplast or phenoplast resin.

5. The curable composition of claim 2 wherein the organic polysiloxane is present in an amount of from 10 to 70 percent by weight based on total resin solids of the coating composition.

6. An organic polysiloxane containing amide functional groups, said polysiloxane having the following structure:

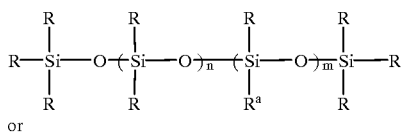
or
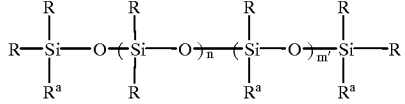
where m is at least 1; m' is 0 to 50; n is 0 to 50; R is selected from the group consisting of H, OH and monovalent hydrocarbon groups connected to the silicon atoms; $R^a$ has the following structure:
$$R_1-O-X$$
wherein $R_1$ is alkylene, oxyalkylene or alkylene aryl; and X is a moiety containing at least one amide functional group.
* * * * *